US008923446B2

(12) United States Patent
Wallace et al.

(10) Patent No.: US 8,923,446 B2
(45) Date of Patent: Dec. 30, 2014

(54) SINGLE-BURST ACQUISITION FOR WIRELESS COMMUNICATION SYSTEM

(75) Inventors: Mark S. Wallace, Bedford, MA (US);
John W. Ketchum, Harvard, MA (US);
Jay Rodney Walton, Carlisle, MA (US);
Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1051 days.

(21) Appl. No.: 12/968,196

(22) Filed: Dec. 14, 2010

(65) Prior Publication Data

US 2011/0103523 A1 May 5, 2011

Related U.S. Application Data

(63) Continuation of application No. 11/750,471, filed on May 18, 2007, now Pat. No. 7,852,972.

(60) Provisional application No. 60/802,627, filed on May 22, 2006.

(51) Int. Cl.
| H04L 27/06 | (2006.01) |
| H04W 52/42 | (2009.01) |
| H04L 27/26 | (2006.01) |
| H04W 52/28 | (2009.01) |

(52) U.S. Cl.
CPC ........... *H04W 52/42* (2013.01); *H04L 27/2613* (2013.01); *H04L 27/2659* (2013.01); *H04L 27/266* (2013.01); *H04W 52/286* (2013.01)
USPC ........................................................ 375/340

(58) Field of Classification Search
None
See application file for complete search history.

(56) References Cited

U.S. PATENT DOCUMENTS

| 6,590,872 B1 * | 7/2003 | Shiue et al. ................... 370/314 |
| 6,687,290 B1 | 2/2004 | Okazaki | |

(Continued)

FOREIGN PATENT DOCUMENTS

| CN | 1564468 A | 1/2005 |
| JP | H0568062 A | 3/1993 |

(Continued)

OTHER PUBLICATIONS

Miyashita M, et al., "A Study on Application of Wireless LAN System to High-Speed Phasing Environment", A Technical Research Report of the Institute of Electronics, Information and Communication Engineers (IEICE), Feb. 22, 2006, vol. 105, No. 623, pp. 259-264, RCS2005-221.

(Continued)

*Primary Examiner* — Tesfaldet Bocure
(74) *Attorney, Agent, or Firm* — QUALCOMM IP Department; James Hunt Yancey, Jr.

(57) ABSTRACT

Techniques for performing acquisition of packets are described. First detection values may be determined based on a first plurality of samples, e.g., by performing delay-multiply-integrate on the samples. Power values may be determined based on the first plurality of samples, e.g., by performing multiply-integrate on the samples. The first detection values may be averaged to obtain average detection values. The power values may also be averaged to obtain average power values. Whether a packet is presence may be determined based on the average detection values and the average power values. Second detection values may be determined based on a second plurality of samples. The start or the packet may be determined based on the first and second detection values. A third detection value may be determined based on a third plurality of samples. Frequency error of the packet may be estimated based on the first and third detection values.

16 Claims, 12 Drawing Sheets

(56) References Cited

U.S. PATENT DOCUMENTS

| | | | |
|---|---|---|---|
| 7,065,036 B1* | 6/2006 | Ryan | 370/208 |
| 7,190,748 B2* | 3/2007 | Kim et al. | 375/345 |
| 7,245,588 B2 | 7/2007 | Poegel et al. | |
| 7,298,772 B1* | 11/2007 | Neerudu et al. | 375/136 |
| 7,852,972 B2 | 12/2010 | Wallace et al. | |
| 2002/0041637 A1* | 4/2002 | Smart et al. | 375/316 |
| 2002/0141506 A1 | 10/2002 | Chen | |
| 2002/0159533 A1 | 10/2002 | Crawford | |
| 2002/0159540 A1 | 10/2002 | Chiodini | |
| 2003/0026201 A1* | 2/2003 | Arnesen | 370/210 |
| 2003/0058962 A1 | 3/2003 | Baldwin | |
| 2003/0067999 A1 | 4/2003 | Echavarri et al. | |
| 2003/0202495 A1 | 10/2003 | Poegel et al. | |
| 2004/0005022 A1* | 1/2004 | Zhu et al. | 375/365 |
| 2004/0014480 A1 | 1/2004 | Liu et al. | |
| 2004/0081205 A1* | 4/2004 | Coulson | 370/503 |
| 2004/0120410 A1 | 6/2004 | Priotti | |
| 2004/0170237 A1* | 9/2004 | Chadha et al. | 375/343 |
| 2005/0025264 A1 | 2/2005 | Chen | |
| 2005/0084035 A1 | 4/2005 | Kim et al. | |
| 2005/0141598 A1 | 6/2005 | Akita | |
| 2005/0168470 A1* | 8/2005 | Prabhakar et al. | 345/531 |
| 2005/0220175 A1 | 10/2005 | Zhou | |
| 2007/0079045 A1* | 4/2007 | Luke | 710/313 |
| 2009/0175362 A1 | 7/2009 | Priotti | |

FOREIGN PATENT DOCUMENTS

| | | |
|---|---|---|
| JP | H1028107 A | 1/1998 |
| JP | 11289309 A | 10/1999 |
| JP | 2000354077 A | 12/2000 |
| JP | 2002534838 A | 10/2002 |
| JP | 2002368715 A | 12/2002 |
| JP | 2003143106 | 5/2003 |
| JP | 2004134997 A | 4/2004 |
| JP | 2005064615 A | 3/2005 |
| JP | 2005318512 A | 11/2005 |
| JP | 2006237946 A | 9/2006 |
| TW | 200501600 | 1/2005 |
| TW | 200503441 | 1/2005 |
| WO | WO-0039946 A1 | 7/2000 |
| WO | WO-2004028055 A1 | 4/2004 |
| WO | WO2005004500 A2 | 1/2005 |
| WO | 2005112320 A2 | 11/2005 |
| WO | 2007137277 A2 | 11/2007 |

OTHER PUBLICATIONS

Nagate Atsushi et al., "A Study on Common Control Channel Synchronization in SCS-MC-CDMA Mode", A Technical Research Report of the Institute of Electronics, Information and Communication Engineers (IEICE), Feb. 27, 2004, vol. 103, No. 67, pp. 125-129, RCS2003-374.

Nandula S., et al., "Robust timing synchronization for OFDM based wireless LAN system," Poster Papers, TENCON 2003, pp. 1558-1561.

Nogami Hiroshi et al., "A Study on OFDM Transmission Mode Determination System", Technical Magazine of the Institute of Electronics, Information and Communication Engineers (IEICE), Dec. 25, 1999, vol. J82-B, No. 12, pp. 2275-2289.

Onizawa T, et al., An Experimental Study on OFDM Demodulator for IEEE802.11a Wireless LAN, A Technical Research Report of the Institute of Electronics, Information and Communication Engineers (IEICE), Sep. 1, 2000, vol. 100, No. 278, pp. 1-8, RCS2000-91.

Taira A., et al., "A Study on Sampling Frequency Offset and Reception Characteristics in OFDM Communication System", A Technical Research Report of the Institute of Electronics, Information and Communication Engineers (IEICE), Jan. 2, 2002, vol. 101, No. 540, pp. 93-100, RCS2001-196.

Taiwan Search Report—TW100100089—TIPO—Jul. 17, 2013.

Wang K., et al., "Timing Synchronization for 802.11a WLANs under Multipath Channels," Proceeding ATNAC, IEEE, 2003, 5 pages.

IEEE 802.11n/D1.0 Draft Amendment to Standard [FOR] Information Technology—Telecommunications and Information exchange between systems—Local and Metropolitan networks—specific requirements Part11 : Wireless LAN Medium Access Control (MAC) and Physical Layer (PHY) specifications: Enhancements for Higher Throughput, IEEE P802.11n/D1.0, Mar. 2006, XP-002469313, pp. i-vii & 119-125.

IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.

IEEE Std. 802.11 g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

Lambrette, et al., "OFDM Burst Frequency Synchronization by Single Carrier Training Data," IEEE Communication Letters, Piscataway, NJ, vol. 1, Issue 2, Mar. 1997, pp. 46-.

Taiwan Search Report—TW096118266—TIPO—Sep. 15, 2011.

Minoru M., et al. "A study of how to apply wireless LAN system in fast fading environment" Technical Report of the Institute of Electronics, Information and Communication Engineers. Feb. 22, 2006. vol. 105. No. 623. pp. 259-264. RCS 2005-221.

Taiwan Search Report—TW100100090—TIPO—Dec. 5, 2013.

Takeshi O., et al. "Experimental Performance of a OFDM Modem Based on a IEEE802.11a Wireless LAN Standard" Technical Report of the Institute of Electronics, Information and Communication Engineers. Sep. 1, 2000. vol. 100, No. 278. pp. 1-8. RCS 2000-91.

Toshinaga, H., et al., "A Study on Packet-end Detection for Random-access Satellite Communication Systems", NTT Network innovation Laboratories wireless systems Laboratories, Aug. 16, 1999, pp. 175, B-3-26.

International Search Report—PCT/US07/069495, International Search Authority—European Patent Office, Jul. 1, 2008.

Partial International Search Report—PCT/US07/069495, International Search Report—European Patent Office, Jan. 16, 2008.

Taiwan Search Report—TW100100085—TIPO—Apr. 15, 2014.

Taiwan Search Report—TW100100090—TIPO—Mar. 24, 2014.

Written Opinion—PCT/US07/069495, International Search Authority—European Patent Office, Jul. 1, 2008.

Yoshikawa H, et al., "A Study on AFC Circuit Structure for OFDM in MMAC-HiSWAN System", Communication Society Convention 2001, Collection 1 of Research Reports in the Lecture, The Institute of Electronics, Information and Communication Engineers (IEICE), Sep. 7, 2000, p. 417.

* cited by examiner

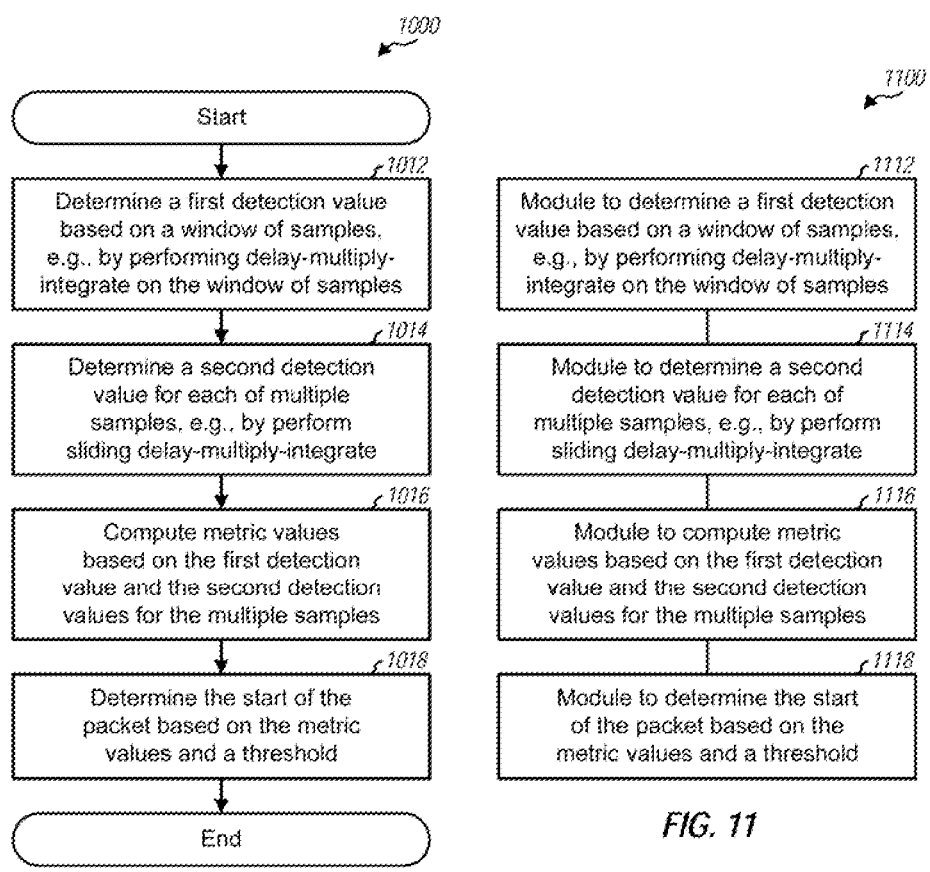

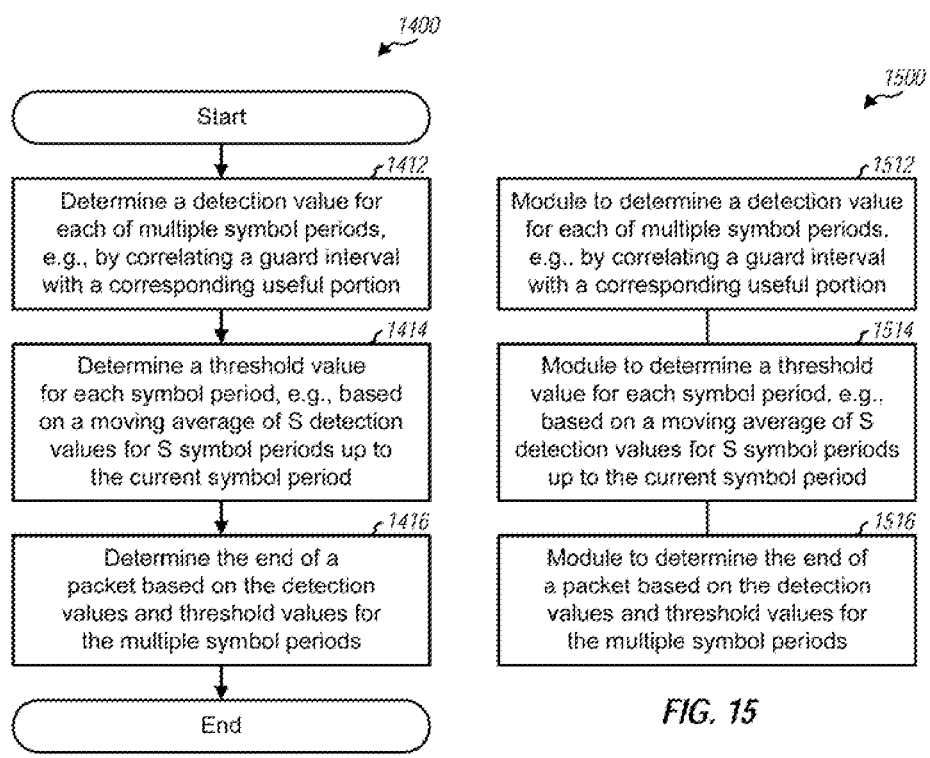

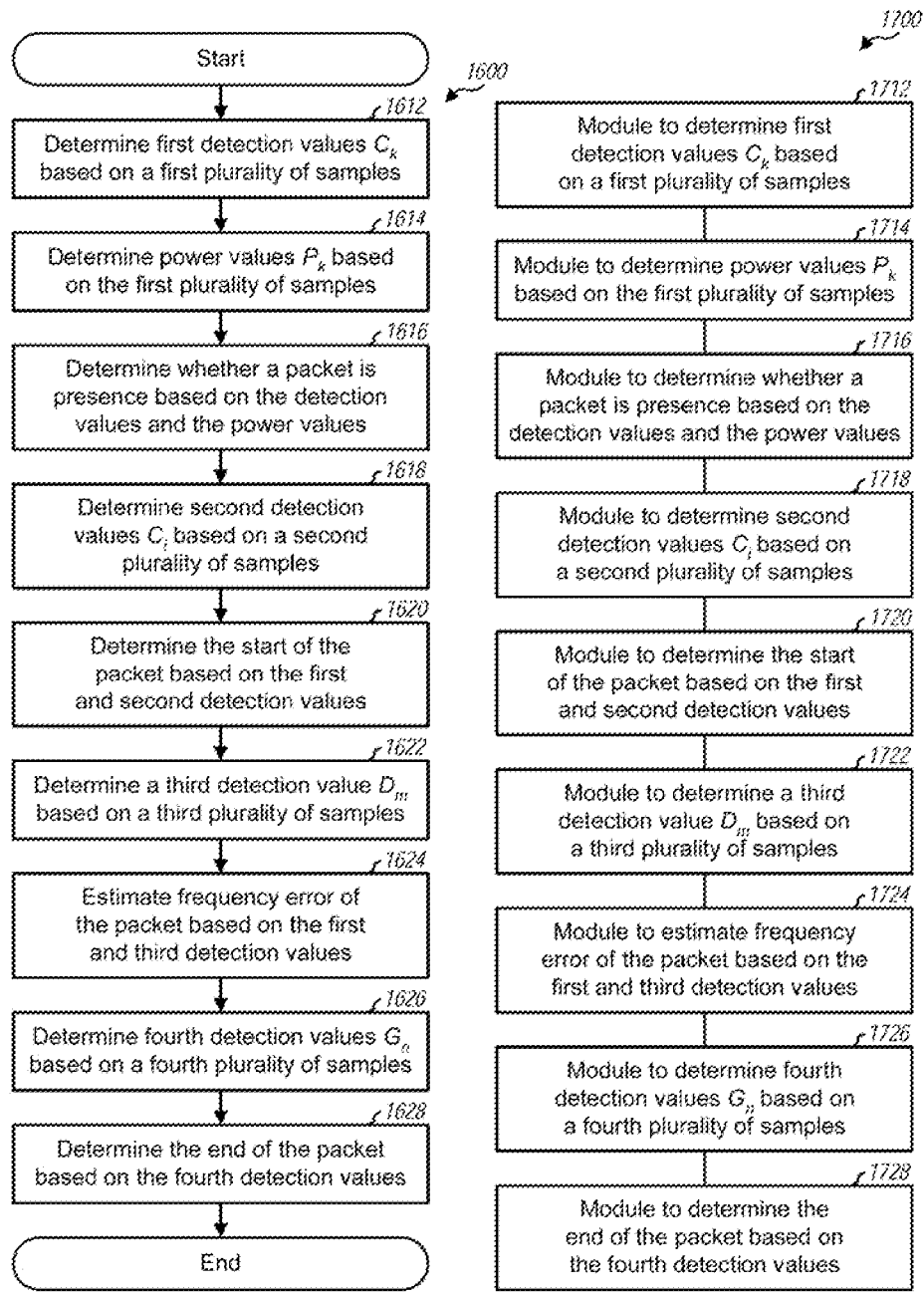

SINGLE-BURST ACQUISITION FOR WIRELESS COMMUNICATION SYSTEM

CLAIM OF PRIORITY UNDER 35 U.S.C. §120

This application is a continuation of U.S. application Ser. No. 11/750,471, filed May 18, 2007, now U.S. Pat. No. 7,852, 972, issued on Dec. 14, 2010, which claims priority to U.S. Provisional Application Ser. No. 60/802,627, entitled "SINGLE-BURST ACQUISITION FOR WIRELESS COMMUNICATION SYSTEM," filed May 22, 2006, both of said applications assigned to the assignee hereof and incorporated herein by reference as if fully set forth below in their entireties.

BACKGROUND

I. Field

The present disclosure relates generally to communication, and more specifically to techniques for performing acquisition in a wireless communication system.

II. Background

In a wireless communication system, a transmitter may process (e.g., encode and modulate) a packet of data to generate data symbols. For a coherent system, the transmitter may multiplex pilot symbols with the data symbols, process the multiplexed data and pilot symbols to generate a modulated signal, and transmit the modulated signal via a wireless channel. The wireless channel distorts the transmitted signal with a channel response and further degrades the signal with noise and interference.

A receiver may receive the transmitted signal and process the received signal to obtain samples. The receiver may perform packet detection in order to detect the presence of the packet. The receiver may also perform time and frequency acquisition in order to ascertain the timing and frequency of the received signal and to correct for any frequency errors. The receiver may then process the frequency-corrected samples to obtain data symbol estimates and may further process (e.g., demodulate and decode) the data symbol estimates to obtain decoded data.

The receiver may not know when packets are being transmitted. Furthermore, the receiver may receive packets from multiple transmitters with different timing, frequency, and transmit power. The receiver would then need to rapidly and accurately detect the presence of packets and quickly perform timing and frequency acquisition of each packet in order to achieve good performance.

There is therefore a need in the art for techniques to quickly and efficiently perform acquisition in a wireless communication system.

SUMMARY

Techniques for quickly and efficiently performing acquisition of packets at a receiver are described herein. In one design, first detection values $C_k$ may be determined based on a first plurality of samples from one or more receive antennas, e.g., by performing delay-multiply-integrate on the samples. Power values $P_k$ may also be determined based on the first plurality of samples, e.g., by performing multiply-integrate on the samples. The first detection values may be averaged to obtain average detection values. The power values may also be averaged to obtain average power values. Whether a packet is presence may then be determined based on the average detection values and the average power values.

Second detection values $C_i$ may be determined based on a second plurality of samples. The start of the packet may then be determined based on the first and second detection values. A third detection value $D_{in}$ may be determined based on a third plurality of samples. Frequency error of the packet may be estimated based on the first and third detection values. The first plurality of samples may comprise samples for short training symbols. The second and third pluralities of samples may each comprise samples for short and/or long training symbols.

Fourth detection values $G_n$ may be determined based on a fourth plurality of samples. Each fourth detection value may be obtained by correlating a copied portion of a transmission symbol (e.g., a guard interval of an OFDM symbol) with the corresponding original portion of the transmission symbol. The end of the packet may be determined based on the fourth detection values.

In general, each detection value may be obtained by performing a delay-multiply-integrate operation on a set of samples. Different detection values may be obtained with different delays for the samples, different integration intervals, etc., as described below.

Various aspects and features of the disclosure are described in further detail below.

BRIEF DESCRIPTION OF THE DRAWINGS

FIG. 10 shows a process to detect for the start of the packet.

FIG. 11 shows an apparatus to detect for the start of the packet.

FIG. 14 shows a process to detect for the end of the packet.

FIG. 14 shows an apparatus to detect for the end of the packet.

FIG. 16 shows a process for processing a packet.

FIG. 17 shows an apparatus for processing a packet.

DETAILED DESCRIPTION

The techniques described herein may be used for various communication systems and networks such as wireless local area networks (WLANs), wireless metropolitan area networks (WMANs), wireless wide area networks (WWANs), etc. The terms "systems" and "networks" are often used interchangeably. A WLAN may implement any of the radio technologies in the IEEE 802.11 family of standards (which is also referred to as Wi-Fi), Hiperlan, etc. A WMAN may implement IEEE 802.16 (which is also referred to as WiMAX), etc. A WWAN may implement a multiple access scheme such a Code Division Multiple Access (CDMA), Frequency Division Multiple Access (FDMA), Time Division Multiple Access (TDMA), Orthogonal FDMA (OFDMA), Single-Carrier FDMA (SC-FDMA), Spatial Division Multiple Access (SDMA), etc. OFDMA utilizes orthogonal frequency division multiplexing (OFDM), and SC-FDMA utilizes single-carrier frequency division multiplexing (SC-FDM). OFDM and SC-FDM partition the system bandwidth into multiple (K) orthogonal subcarriers, which are also referred to as tones, bins, etc. Each subcarrier may be modulated with data. In general, modulation symbols are sent in the frequency domain with OFDM and in the time domain with SC-FDM. An OFDMA system may implement a radio technology such as IEEE 802.20, Ultra Mobile Broadband (UMB), Flash-OFDM®, Long Term Evolution (LIE), etc. These various radio technologies and standards are known in the art. For clarity, the techniques are described below for a WLAN that implements an IEEE 802.11 standard utilizing OFDM, e.g., IEEE 802.11a, 802.11g, and/or 802.11n.

The techniques described herein may also be used for single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception.

Figure 1:
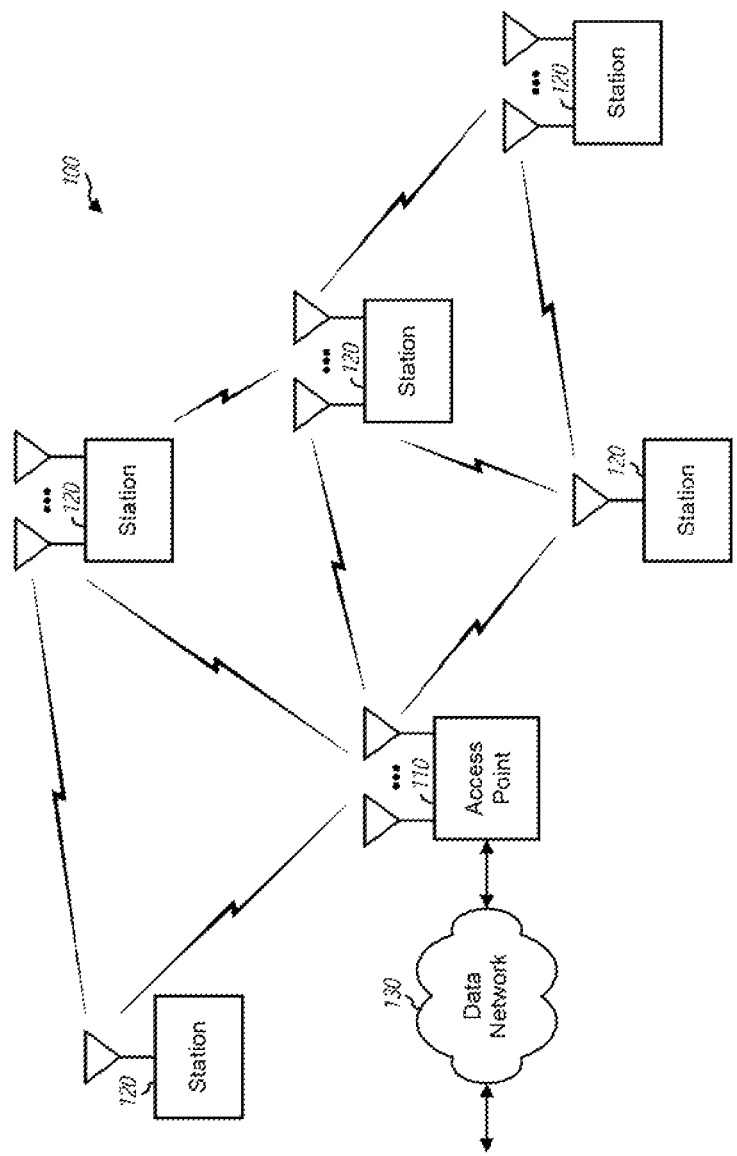
FIG. 1 shows a wireless network with an access point and multiple stations.

FIG. 1 shows a wireless network 100 with an access point 110 and multiple stations 120. In general, a wireless network may include any number of access points and any number of stations. A station is a device that can communicate with another station via a wireless medium. A station may also be called, and may contain some or all of the functionality of, a terminal, a mobile station, a user equipment, a subscriber station, etc. A station may be a cellular phone, a handheld device, a wireless device, a personal digital assistant (PDA), a laptop computer, a wireless modem, a cordless phone, etc. An access point is a station that provides access to distribution services via the wireless medium for stations associated with that access point. An access point may also be called, and may contain some or all of the functionality of, a base station, a base transceiver station (BTS), a Node B, etc. Access point 110 may couple to a data network 130 and may communicate with other devices via data network 130.

Figure 2:
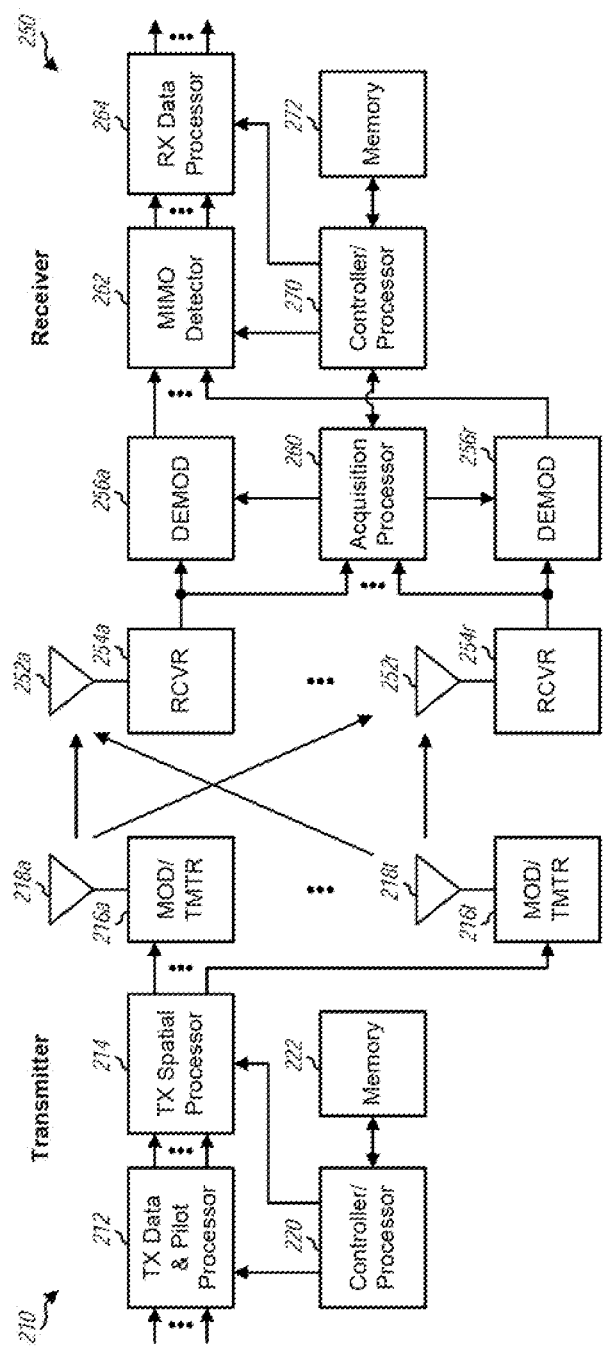
FIG. 2 shows a block diagram of a transmitter and a receiver.

FIG. 2 shows a block diagram of a design of a transmitter 210 and a receiver 250. For downlink/forward link, transmitter 210 may be part of access point 110, and receiver 250 may be part of a station 120. For uplink/reverse link, transmitter 210 may be part of a station 120, and receiver 250 may be part of access point 110. In FIG. 2, transmitter 210 is equipped with multiple (T) antennas, and receiver 250 is equipped with multiple (R) antennas. Each transmit antenna and each receive antenna may be a physical antenna or an antenna array. In general, transmitter 210 and receiver 250 may each be equipped with any number of antennas.

At transmitter 210, a transmit (TX) data and pilot processor 212 may receive packets of data from a data source (not shown) and/or other data from a controller/processor 220. Processor 212 may process (e.g., format, encode, interleave, and symbol map) each packet and generate data symbols, which are modulation symbols for data. Processor 212 may also process pilot (which is known data) to generate pilot symbols and may multiplex the pilot symbols with data symbols. ATX spatial processor 214 may perform transmitter spatial processing on the data and pilot symbols and provide T streams of output symbols to T modulators/transmitters (MOD/TMTR) 216a through 216t. Each modulator 216 may process its output symbol stream (e.g., for OFDM) to generate an output chip stream. Each transmitter 216 may further condition (e.g., convert to analog, amplify, filter, and upconvert) its output chip stream to generate a modulated signal. T modulated signals from transmitters 216a through 216t may be transmitted from antennas 218a through 218t, respectively.

At receiver 250, R antennas 252a through 252r may receive the T modulated signals from transmitter 210, and each antenna 252 may provide a received signal to a respective receiver (RCVR) 254. Each receiver 254 may condition (e.g., amplify, filter, downconvert, and digitalize) its received signal to obtain samples and may provide the samples to an associated demodulator (DEMOD) 256 and an acquisition processor 260. Acquisition processor 260 may receive and process samples from all R receivers 254a through 254r to detect for packets, to determine the timing and frequency of each packet, etc. Each demodulator 256 may process its samples to remove frequency errors and may further process the frequency-corrected samples (e.g., for OFDM) to obtain received symbols. A MIMO detector 262 may process the received symbols to derive an estimate of the channel response from transmitter 210 to receiver 250. MIMO detector 262 may also perform MIMO detection on the received symbols for all R antennas with the channel estimate and provide data symbol estimates, which are estimates of the data symbols transmitted by access point 110. An RX data processor 264 may then process (e.g., symbol demap, deinterleave, and decode) the data symbol estimates and provide decoded data to a data sink (not shown) and/or a controller/processor 270.

Controllers/processors 220 and 270 may control the operation at transmitter 210 and receiver 250, respectively. Memories 222 and 272 may store data and program codes for transmitter 210 and receiver 250, respectively.

IEEE 802.11a/g utilizes a subcarrier structure that partitions the system bandwidth into K=64 subcarriers, which are assigned indices of −32 to +31. These 64 total subcarriers include 48 data subcarriers with indices of $\pm\{1, \ldots, 6, 8, \ldots, 20, 22, \ldots, 26\}$ and four pilot subcarriers with indices of $\pm\{7, 21\}$. The DC subcarrier with index of 0 and the remaining subcarriers are not used. This subcarrier structure is described in IEEE Standard 802.11a, entitled "Part 11: Wireless LAN Medium Access Control (MAC) and Physical Layer (PHY) Specifications: High-speed Physical Layer in the 5 GHz Band," September 1999, which is publicly available. IEEE 802.11n utilizes a subcarrier structure with 64 total subcarriers that include 52 data subcarriers with indices of $\pm\{1, \ldots, 6, 8, \ldots, 20, 22, \ldots, 28\}$ and four pilot subcarriers with indices of $\pm\{7, 21\}$.

In IEEE 802.11, a Medium Access Control (MAC) layer processes data as MAC protocol data units (MPDUs). A Physical Layer Convergence Protocol (PLCP) then processes each MPDU, which is referred to as a PLCP service data unit (PSDU), to generate a PLCP protocol data unit (PPDU). A physical layer then processes each PPDU to generate a frame, which is transmitted via a wireless channel. A frame may also be referred to as a packet.

Figure 3:
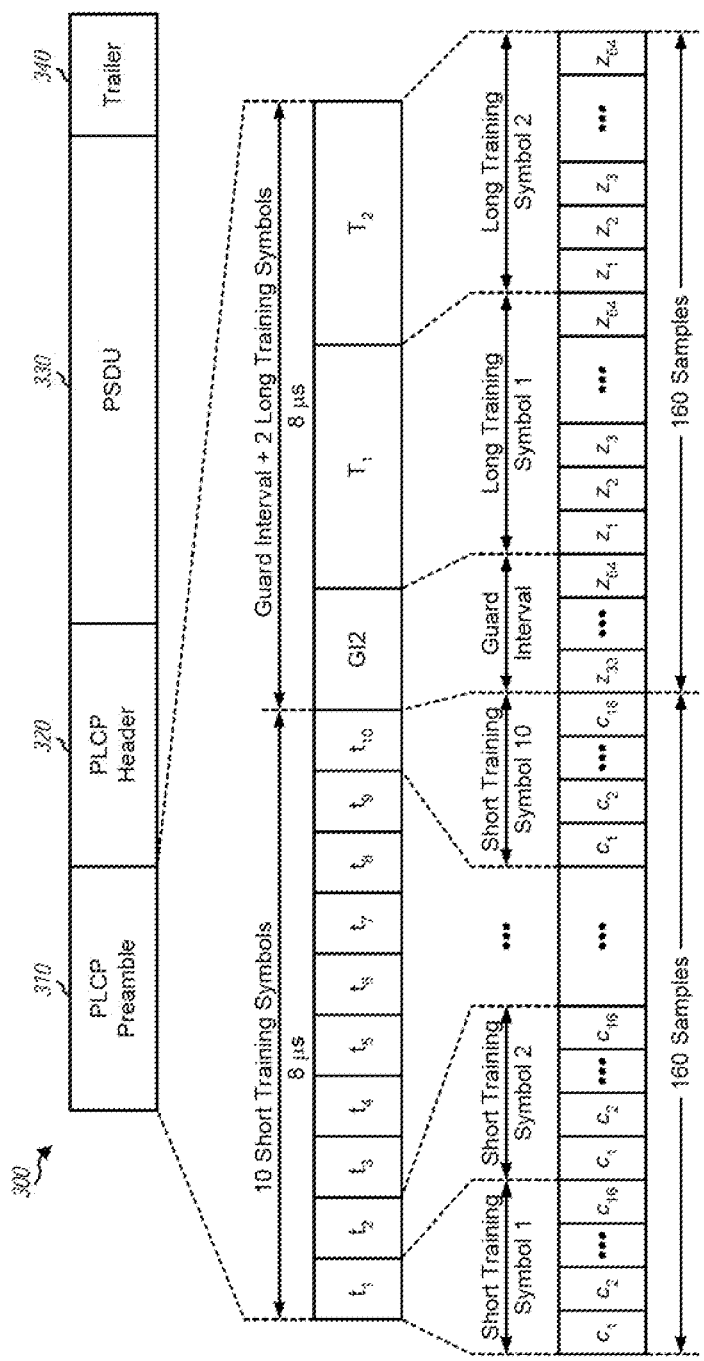
FIG. 3 shows a frame structure used in IEEE 802.11a/g.

FIG. 3 shows a frame/packet structure used in IEEE 802.11a/g. At the physical layer (PHY), data is processed and transmitted in frames/packets. Each packet 300 includes a PLCP preamble 310, a PLCP header 320, a PSDU 330, and a trailer 340. PSDU 330 carries traffic data for packet 300 and has a variable length. Trailer 340 includes six tail bits and pad bits, if necessary.

PLCP preamble 310 includes ten short training symbols denoted as $t_1$ through $t_{10}$, followed by a guard interval for a long training symbol, and further followed by two long training symbols denoted as $T_1$ and $T_2$. The ten short training symbols are sent in two OFDM symbol periods. The guard interval and two long training symbols are also sent in two OFDM symbol periods. Each OFDM symbol period is 4 micro seconds (μs) in IEEE 802.11a/g.

The short training symbols are generated by mapping 12 specific modulation symbols to 12 specific subcarriers, mapping zero signal values to the remaining 52 subcarriers, and performing a 64-point fast Fourier transform (FFT) on the 64 total symbols to obtain 64 time-domain samples. The 12 modulation symbols are mapped to 12 subcarriers that are spaced apart by multiples of four subcarriers in the frequency domain. This results in the 64 time-domain samples being periodic and composed of four identical sequences, with each sequence including 16 samples denoted as $c_1$ through $c_{16}$. Each short training symbol is one sequence of 16 samples. The last short training symbol may be inverted to improve detection of time origin by receiver 250 (not specified in IEEE 802.11a/g and not shown in FIG. 3). The ten short training symbols include a total of 160 samples.

The long training symbols are generated by mapping 52 specific modulation symbols to 52 specific subcarriers, mapping zero signal values to the remaining 12 subcarriers, and performing a 64-point FFT on the 64 total symbols to obtain 64 time-domain samples denoted as $z_1$ through $z_{64}$. The guard interval includes the last 32 samples $z_{33}$ through $z_u$ of the FFT output. Each long training symbol is one sequence of 64 samples. The guard interval and long training symbols for the T transmit antennas may be cyclically shifted by different amounts to improve diversity. The two long training symbols and the guard interval include a total of 160 samples. The short and long training symbols are described in IEEE 802.11a/g documents.

Receiver 250 may not know a priori when or which transmitters will be transmitting. Different transmitters may have different reference clock frequencies and may thus have different timing and/or frequency offsets relative to the timing and frequency of receiver 250. Receiver 250 may continually detect for packets from transmitters while it is powered on. Receiver 250 may acquire each packet independently since the transmitting source and the frequency of each packet may not be known. Receiver 250 may perform the following for each packet:

Packet detection—detect the presence of the packet,
Start-of-packet detection—detect the start of the packet,
Coarse frequency estimation—estimate coarse frequency error,
Fine frequency estimation and correction—estimate and correct fine frequency error in the samples for the packet,
Automatic gain control (AGC)—adjust receiver gain based on received power, and
End-of-packet detection—detect the end of the packet.
Each of the tasks may be performed as described below.

Receiver 250 may perform detection and acquisition based on the short and long training symbols in the PLCP header of each packet. It is desirable to detect the presence of a packet as quickly and accurately as possible, so that more time may be available for other tasks. It is also desirable to correct any frequency errors by the start of the PLCP header so that the PLCP header can be reliably demodulated.

Receiver 250 may perform packet detection based on a delay-multiply-integrate technique. For this technique, a delay-multiply-integrate operation on a window of N samples may be given as:

$$C_k = \sum_{j=1}^{R} \sum_{i=(k-1)N}^{kN-1} x_{i,j} \cdot x_{i-16,j}^*, \qquad \text{Eq (1)}$$

where $x_{i,j}$ is a sample from the j-th antenna in the i-th sample period,
$C_k$ is a detection value for the k-th window, and
"*" denotes a complex conjugate.

Equation (1) performs an auto-correlation at a delay of 16, which is the length of one short training symbol. For each antenna j, sample $x_{i,j}$ is multiplied with the complex conjugate of sample $x_{i-16,j}$ from 16 sample periods earlier. Since the short training symbols repeat every 16 samples, $x_{i,j}$ and $x_{i-16,j}$ should correspond to the same transmitted sample. The multiplication results for N samples in window k are integrated to obtain a result for antenna j. The results for all R antennas are then summed to obtain the detection value $C_k$ for window k. The window size N may be any suitably selected value. For example, N may be equal to 16, 32, etc., for the short training symbols shown in FIG. 3. Window k can start at any sample period.

The power of each window of N samples may also be computed as:

$$P_k = \sum_{j=1}^{R} \sum_{i=(k-1)N}^{kN-1} x_{i,j} \cdot x_{i-16,j}^*, \qquad \text{Eq (2)}$$

where $P_k$ is a power value for the k-th window. The power is obtained by multiplying sample $x_{i,j}$ with its complex conjugate $x_{i,j}^*$ (instead of the complex conjugate of another sample that is 16 sample periods earlier).

In general, a detection value $C_k$ and a power value $P_k$ may be computed for each window of samples obtained from R receivers 254a through 254r. For clarity, window index k and sample index i are defined relative to the start of a packet. In actuality, receiver 250 does not know the start of a packet when detecting for the packet, and indices k and i are simply incremented over time.

The detection values $C_k$ may be averaged over L windows, as follows:

$$A_k = \frac{1}{L} \cdot \sum_{l=0}^{L-1} C_{k-l}, \qquad \text{Eq (3)}$$

where $A_k$ is an average detection value for the k-th window. Equation (3) computes the average detection value for the current window based on the detection values for the current window and L−1 prior windows. L may be any suitably selected value, e.g., L=4. Equation (3) may be computed based on L detection values for L windows. Alternatively, equation (3) may be implemented with a moving average, which is an efficient way of computing an average value for the current window based on an average value for a prior window. In general, averaging refers to a process of deriving an average value based on at least two values, e.g., current and prior values. Averaging may be performed based on any function such as the function shown in equation (3), a finite impulse response (FIR) filter function, an infinite impulse response (IIR) filter function, etc.

The power values may be averaged over L+1 windows, as follows:

$$B_k = \frac{1}{L+1} \cdot \sum_{l=0}^{L} P_{k-l}, \qquad \text{Eq (4)}$$

where $B_k$ is an average power value for the k-th window.

The average detection value $A_k$ is obtained based on L+1 windows of samples. The first two windows are used to generate the first detection value, and each additional window provides one additional detection value. The average power value $B_k$ is also obtained based on L+1 windows of samples, with each window providing one power value $P_k$. Hence, $A_k$ and $B_k$ are computed over the same block of samples.

A metric value $M_k$ may be computed for each window k, as follows:

$$M_k = \frac{|A_k|}{B_k}. \qquad \text{Eq (5)}$$

In one design, detection of a packet may be defined as follows:

If $M_k > M_{TH}$, then declare presence of a packet,

Else if $M_k \leq M_{TH}$, then declare no packet, Eq (6)

where $M_{TH}$ is a detection threshold.

$M_{TH}$ may be selected based on a tradeoff between probability of detection and probability of false alarm. Detection probability is the probability of declaring the presence of a packet when it is present. False alarm probability is the probability of declaring the presence of a packet when it is not present. $M_{TH}$ may also be defined to include the factor 1/L in the computation of $A_k$ and the factor 1/(L+1) in the computation of $B_k$. In this case, factor 1/L may be removed from equation (3), and factor 1/(L+1) may be removed from equation (4).

Equation (5) shows derivation of metric value $M_k$ based on a ratio function, and equation set (6) shows one design of packet detection. In general, a metric value used for packet detection may be defined based on any function, which may receive any input parameters. The test for packet detection may be defined based on the function used to compute the metric value.

Figure 4:
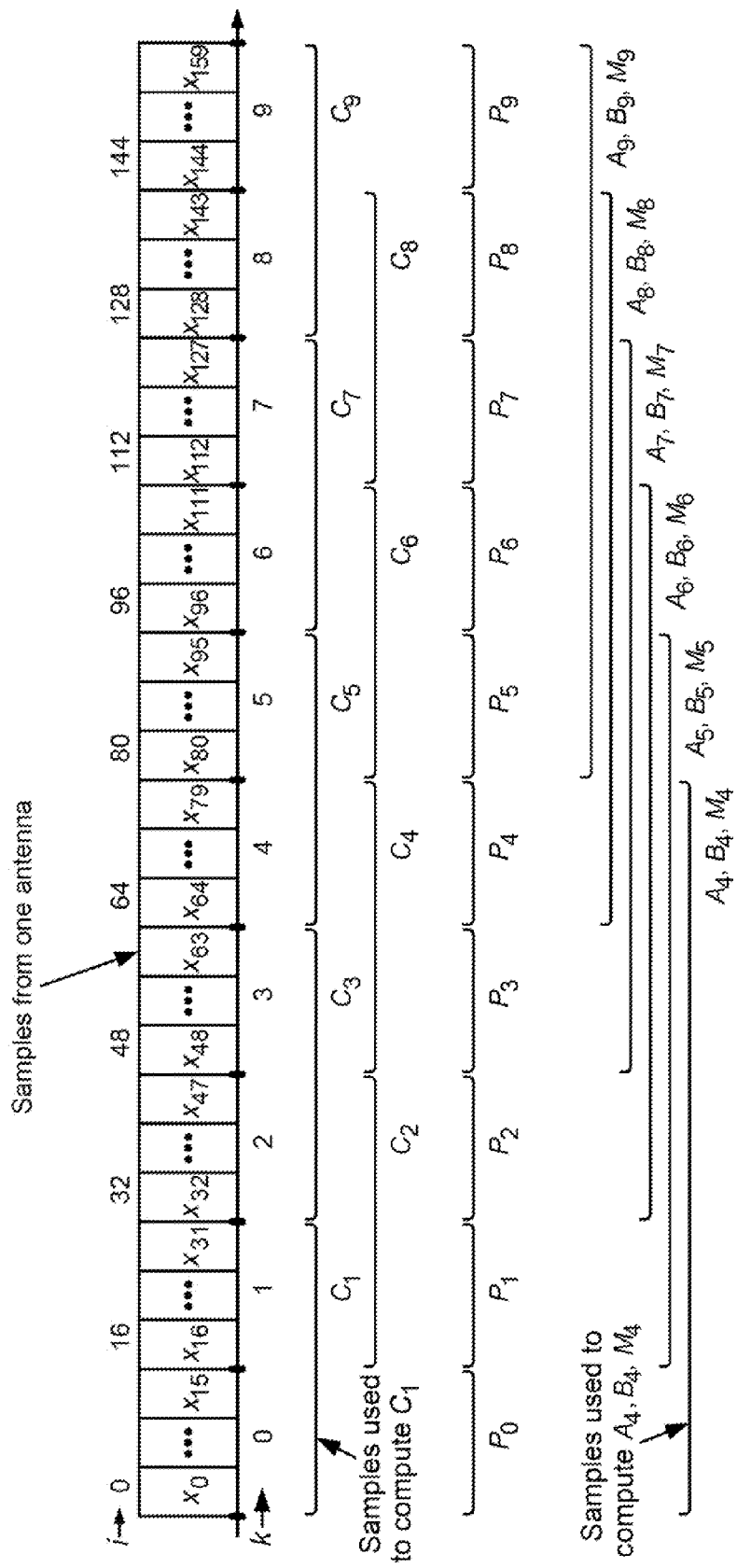
FIG. 4 illustrates computation of different detection values for a packet

FIG. 4 illustrates computation of $C_k$, $P_k$, $A_k$, $B_k$ and $M_k$ for a packet with N=16, L=4, and each window covering one short training symbol. For clarity, sample index i starts at 0 for the first sample in the packet, and window index k starts at 0 for the first short training symbol in the packet. One detection value $C_k$ is obtained for each short training symbol after the first short training symbol. One power value $P_k$ is obtained for each short training symbol. An average detection value $A_k$, an average power value $B_k$, and a metric value $M_k$ are obtained for each short training symbol starting with the fifth short training symbol at k=4.

The averaging of $C_k$ and $P_k$ over L+1 windows may improve the reliability of $A_k$ and $B_k$, respectively, which may improve detection performance. $A_k$ and $B_k$ are essentially computed over a sliding larger window covering L+1 windows of N samples, as illustrated in FIG. 4. By computing $A_k$ and $B_k$ for each window k (instead of every L+1 windows), a decision on packet detection may be made in each window k (instead of every L+1 windows).

To improve detection reliability, detection of a packet may be conditioned on multiple metric values exceeding the threshold $M_{TH}$. In one design, a packet may be declared based on two metric values $M_k$ and $M_{k+1}$ for two consecutive windows k and k+1, respectively, as follows:

If $(M_k > M_{TH})$ AND $(M_{k+1} > M_{TS})$ then declare presence of a packet,

Else declare no packet. Eq (7)

In general, detection of a packet may be based on any number of metric values for any number of windows.

To further improve detection reliability, detection of a packet may be conditioned on the samples having valid frequency errors. For IEEE 802.11a, the maximum frequency error at a transmitter is ±20 parts per million (ppm), which corresponds to ±230 KHz at 5.8 GHz. For a sample rate of 20 mega samples per second (Msps), each short training symbol spans 800 nano seconds (ns), and the maximum phase shift between two samples spaced part by one short training symbol is ±0.184 cycles. A false alarm may be declared if, for a given window with $M_k$ exceeding $M_{TH}$, the average phase shift for that window is greater than 0.184 cycles.

The quantity $x_{i,j} \cdot x_{i-16,j}^*$ in equation (1) gives the phase shift from sample $x_{i-16,j}$ to sample $x_{i,j}$, which is 16 sample periods later. The angle of $C_k$ provides the average phase shift across 16 sample periods based on the samples in window k. The angle of $A_k$ provides the average phase shift across 16 sample periods based on the samples in the L windows used to compute $A_k$. The average phase shift $\theta_k$ for window k may be obtained as follows:

$$\theta_k = \angle A_k = \arctan\left(\frac{\text{Im}\{A_k\}}{\text{Re}\{A_k\}}\right). \qquad \text{Eq (8)}$$

If a packet is declared as shown in equation (7), then the average phase shifts $\theta_k$ and $\theta_{k+1}$ for windows k and k+1, respectively, may be computed and compared against a phase threshold $\theta_{TH}$, as follows:

If $(\theta_k > \theta_{TH})$ OR $(\theta_{k+1} > \theta_{TH})$ then declare false alarm or no packet. Eq (9)

The phase threshold $\theta_{TH}$ may be set to any value greater than $0.184 \times 2\pi$ radians. For example, $\theta_{TH}$ may be set as $\theta_{TH} = \pi/4$ radians to simplify implementation.

The timing of the detected packet may be determined by detecting for the boundary between the short and long training symbols. To achieve this, a detection value $C_i$ may be computed for each sample period i, as follows:

$$C_i = \sum_{j=1}^{R} \sum_{m=0}^{63} x_{i-m,j} \cdot x_{i-m-64,j}^*. \qquad \text{Eq (10)}$$

Equation (10) performs a sliding delay-multiply-integrate operation to obtain $C_i$ for each sample period of interest. In each sample period, $C_i$ is computed based on a window of 64 samples composed of the current sample $x_{i,j}$ and 63 earlier samples. In the absence of noise, $C_i$ goes through zero when the window of 64 samples (i) is centered at the boundary between the short and long training symbols and (ii) covers two short training symbols and half of a long training symbol.

A metric value $Q_i$ may be computed for each sample period i, as follows:

$$Q_i = \text{Re}\{A_k^* \cdot C_i\}. \quad \text{Eq (11)}$$

As shown in equation (11), $Q_i$ is computed based on $C_i$ and $A_k$, where $C_i$ is updated every sample, and $A_k$ is updated every window of N samples.

The start of the long training symbols may then be detected, as follows:

If $Q_i < Q_{TH}$ then declare the start of the long training symbols at sample i, $\quad$ Eq (12)

where $Q_{TH}$ is a threshold. $Q_{TH}$ may be set to a suitable positive value.

If the last short training symbol is inverted (not shown in FIG. 3), then the boundary between the ninth and tenth short training symbols may be detected. In this case, $C_i$ may be computed with a delay of 16 (instead of 64) and an integration interval of 16 (instead of 64). $A_k$ from at least 16 samples earlier than the current sample $x_{i,j}$ be used to compute $Q_i$ to avoid contaminating $A_k$ with the inverted short training symbol. $Q_{TH}$ may be set to zero.

In any case, after detecting the start of the long training symbols, e.g., as shown in equation (12), the last value of $A_k$ may be used as a coarse frequency error estimate.

The long training symbols may be used for fine frequency correction. A detection value may be computed for a window of M samples as follows:

$$D_m = \sum_{j=1}^{R} \sum_{i=m}^{m+M-1} x_{i,j} \cdot x_{i-64,j}^*, \quad \text{Eq (13)}$$

where $D_m$ is a detection value for sample period m. Since the long training symbols repeat every 64 samples, $x_{i,j}$ and $x_{i-64,j}$ should correspond to the same transmitted sample.

The boundary between the short and long training symbols may be considered as the time origin of the detected packet and may be determined as shown in equation (12). Equation (13) may be computed after the time origin is known and may then be computed for a single sample period m. The number of samples to integrate, M, may be any suitable value, e.g., between 16 to 64. A smaller M may allow for completion of fine frequency correction more quickly, which may in turn allow the second long training symbol to be frequency-corrected and used as a pilot reference for demodulation of the PLCP header.

The angle of $D_m$ may be used as an average phase shift $\phi_m$ across 64 sample periods and may be given as:

$$\phi_m = \angle D_m = \arctan\left(\frac{\text{Im}\{D_m\}}{\text{Re}\{D_m\}}\right). \quad \text{Eq (14)}$$

For the worst-case frequency error of ±20 ppm at 5.8 GHz, the maximum phase shift between two samples spaced part by one long training symbol is ±0.736 cycles. The average phase shift $\phi_m$ in equation (14) is thus ambiguous since for a given computed phase value of y, where |y|>0.264 cycles, it is not known whether the true phase shift is y, 1−y, or 1+y cycle.

The phase ambiguity in the fine phase shift $\phi_m$ may be resolved by using the coarse phase shift $\theta_k$ obtained from the short training symbols. The phase shift across a 64-sample long training symbol should be approximately four times the phase shift across a 16-sample short training symbol, or $$\phi_m' \approx 4 \cdot \theta_k. \quad \text{Eq (15)}$$

where $\phi_m'$ is a phase correction value. $\phi_m'$ may be obtained by adding or subtracting one cycle to $\phi_m$, if needed, in order to make $\phi_m'$ as close as possible to $4\theta_k$.

A per-sample phase correction value $\phi_s'$ may be obtained by dividing the fine phase correction value $\phi_m'$ by 64, or $\phi_s' = \phi_m'/64$. The samples from receivers 254a through 254r may be rotated by the per-sample phase correction value $\phi_s'$ to obtain frequency-corrected samples.

In another design, a fine frequency error estimate may be derived based on the short training symbols. Detection values $D_m$ may be computed concurrently with the average detection values $A_k$. When a packet is detected, the average phase shift $\theta_k$ may be determined based on the latest $A_k$, and the angle of $D_m$ may be determined and corrected with $\theta_k$, if necessary, to obtain the fine phase correction value $\phi_m'$. $\phi_m'$ may then be applied to the samples prior to the arrival of the first long training symbol. In this design, frequency-corrected samples may be obtained for the two long training symbols and may be transformed with 64-point FFTs to obtain received symbols. A channel estimate may then be derived based on the received symbols and used for coherent demodulation of the PLCP header. This design may avoid additional buffering of the samples from receivers 254 for frequency correction. The long training symbols may also be used to refine the fine frequency error estimate. The update to the fine frequency error estimate, obtained from the long training symbols, may be applied to the samples at any time. Integration to a point near the end of the second long pilot symbol may provide the most accurate fine frequency error update.

For AGC, receiver 250 may be set to the maximum gain initially in order to detect for low power packets. A radio frequency (RF) front end of receiver 250 may saturate with the maximum gain, thereby effectively clipping the received signal. However, the delay-multiply-integrate operation in equation (1) would still be valid even with clipping. The power value $P_k$ may be compared against a power threshold, and the receiver gain may be reduced if the power threshold is exceeded. The receiver gain may be maintained until end-of-packet is detected and may then be reset to the maximum value.

The PLCP header may be followed by a variable number of OFDM symbols. Each OFDM symbol is generated by (i) performing a 64-point FFT on 64 symbols for 64 subcarriers to obtain 64 time-domain samples for a useful portion of the OFDM symbol and (ii) appending a guard interval to the useful portion by copying the last 16 samples of the useful portion and appending these 16 samples to the front of the useful portion to obtain 80 samples for the OFDM symbol.

To detect for end-of-packet, a detection value may be computed for each OFDM symbol period, as follows:

$$G_n = \text{Re}\left\{\sum_{j=1}^{R} \sum_{i=80n}^{80n+16} x_{i,j} \cdot x_{i-64,j}^*\right\}, \quad \text{Eq (16)}$$

where $G_n$ is the detection value for OFDM symbol period n. In equation (16), the 16 samples of the guard interval for an OFDM symbol are correlated with the last 16 samples of the useful portion of the OFDM symbol period.

A threshold $G_{TH}$ may be defined based on an average of the detection values for S OFDM symbol periods, as follows:

$$G_{TH,n} = \eta \cdot \sum_{l=0}^{S-1} G_{n-l}, \quad \text{Eq (17)}$$

where $\eta$ is a percentage of the average of $G_n$ to use for the threshold.

In each OFDM symbol period, $G_n$ may be computed, $G_{TH,n}$ may be updated, and $G_n$ may be compared against $G_{TH,n}$. In one design, end-of-packet is detected if $G_n$ is less than $G_{TH,n}$, which may be expressed as:

If $G_n < G_{TH,n}$ then declare end-of-packet.     Eq (18)

In another design, if $G_n$ is less than $G_{TH,n}$, then $G_{TH,n}$ is frozen, and end-of-packet is detected if $G_{n+1}$ for the next OFDM symbol period n+1 is also less than $G_{TH,n}$, which may be expressed as:

If $(G_n < G_{TH,n})$ AND $(G_{n+1} < G_{TH,n})$ then declare end-of-packet.     Eq (19)

End-of-packet may also be detected in other manners. In any case, when end-of-packet is detected, the AGC may be reset to the maximum gain, and the frequency offset may be reset to zero to get ready for the next packet.

Figure 5:
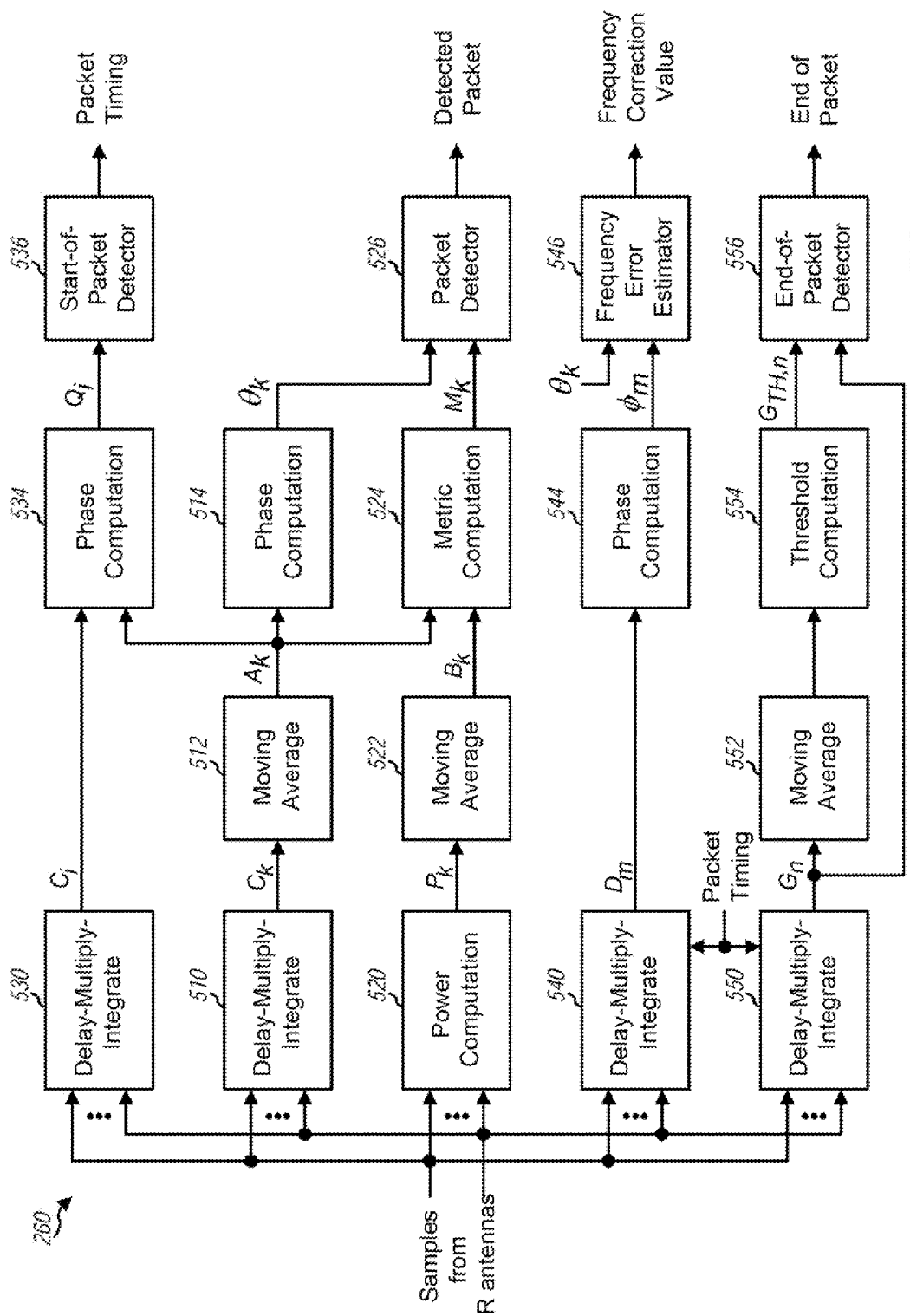
FIG. 5 shows a block diagram of an acquisition processor at the receiver.

FIG. 5 shows a block diagram of a design of acquisition processor 260 in FIG. 2. A unit 510 receives samples from all R antennas, performs delay-multiply-integrate, e.g., as shown in equation (1), and provides a detection value $C_k$ for each window of N samples. A unit 512 computes a moving average of $C_k$ over L windows, e.g., as shown in equation (3), and provides an average detection value $A_k$ for each window. A unit 514 determines the phase of $A_k$, e.g., as shown in equation (8), and provides an average phase shift $\theta_k$ for each window.

A unit 520 computes a power value $P_k$ based on the samples from all R antennas in each window, e.g., as shown in equation (2). A unit 522 computes a moving average of $P_k$ over L+1 windows, e.g., as shown in equation (4), and provides an average power value $B_k$ for each window. A unit 524 receives the average detection value $A_k$ and the average power value $B_k$ for each window and computes a metric value $M_k$ for that window, e.g., as shown in equation (5). A unit 526 detects for the presence of a packet based on the metric value $M_k$ and possibly the average phase shift $\theta_k$, e.g., as shown in equations (6), (7) and/or (9).

After a packet is detected, a unit 530 computes a detection value $C_i$ for each sample period, e.g., as shown in equation (10). A unit 534 receives the detection value $C_i$ for each sample and the average detection value $A_k$ for the last window prior to packet detection and computes a metric value $Q_i$ for each sample period, e.g., as shown in equation (11). A unit 536 detects for the start of the packet based on the metric values $Q_i$, e.g., as shown in equation (12), and provides packet timing, which may be the sample period of the boundary between the short and long training symbols or some other known point in the packet.

A unit 540 computes a detection value $D_m$ for a specific sample period in determined by the packet timing, e.g., as shown in equation (13). A unit 544 determines the phase of $D_m$, e.g., as shown in equation (14), and provides an average phase shift $\phi_m$. A unit 546 receives the average phase shift $\theta_k$ obtained from the last short training symbol and the average phase shift $\phi_m$ obtained from either the long or short training symbols and determines a frequency correction value $\phi_m'$, e.g., as shown in equation (15).

For end-of-packet detection, a unit 550 computes a detection value $G_n$ for each OFDM symbol period, e.g., as shown in equation (16). A unit 522 computes a moving average of $G_n$ over S OFDM symbol periods. A unit 554 computes a threshold value $G_{TH,n}$ for each OFDM symbol period, e.g., as shown in equation (17). A unit 556 detects for the end of the packet based on the detection values $G_n$ and the threshold values $G_{TH,n}$, as discussed above.

Figure 6:
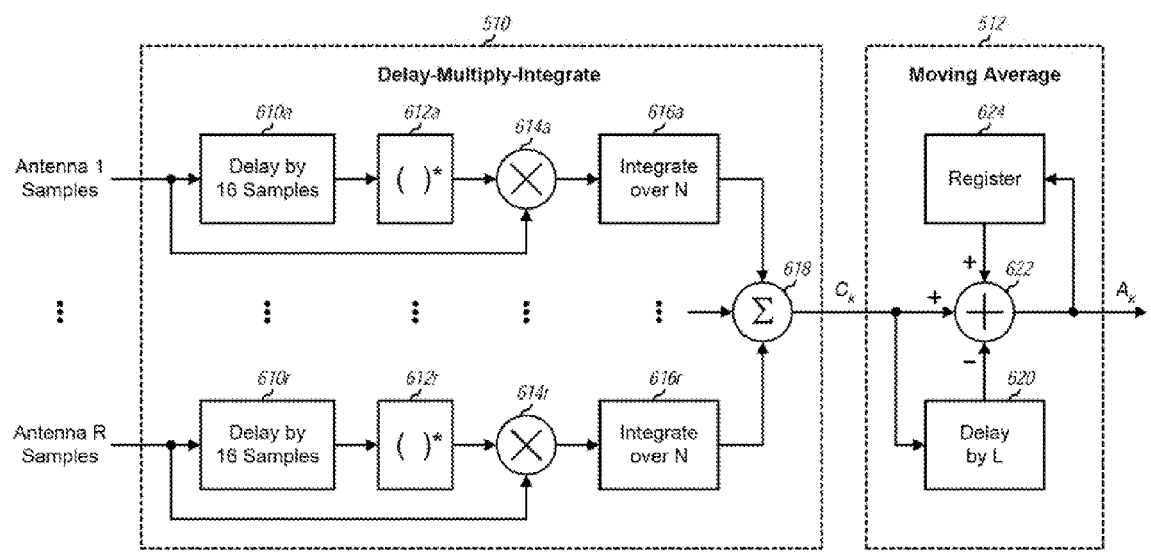
FIG. 6 shows a block diagram of a delay-multiply-integrate unit and a moving average unit within the acquisition processor.

FIG. 6 shows a block diagram of a design of delay-multiply-integrate unit 510 and moving average unit 512 in FIG. 5.

Within unit 510, samples from antenna 1 are provided to a delay unit 610a and multiplier 614a. Delay unit 610a provides 16 samples of delay, which is the duration of one short training symbol. A unit 612a provides the complex conjugate of each sample received from delay unit 610a. In each sample period, multiplier 614a multiplies the received sample with the sample from unit 612a and provides the result to an integrator 616a. Integrator 616a is reset at the start of each window and integrates the results from multiplier 614a over N sample periods. The samples from each remaining antenna are processed in the same manner as the samples from antenna 1. A summer 618 sums the outputs of integrators 616a through 616r for all R antennas and provides a detection value $C_k$ for each window.

Within unit 512, a delay unit 620 delays the detection value $C_k$ by L, which is the duration of the moving average for $A_k$. For each window, a summer 622 sums the detection value $C_k$ from unit 510 with the output of a register 624, further subtracts the output of delay unit 620, and provides an average detection value $A_k$. Units 622 and 624 form an accumulator that is updated in each window k. Unit 620 provides the detection value $C_{k-1}$, from L windows earlier, which is subtracted from the current accumulation result so that the moving average is over L windows.

Units 530, 540 and 550 in FIG. 5 may be implemented in similar manner as unit 510, albeit with different delays for units 610a through 610r and/or different integration lengths in integrators 616a through 616r. Unit 520 may be implemented in similar manner as unit 510, albeit without delay units 610a through 610r. Units 522 and 552 may be implemented in similar manner as unit 512, albeit with different delays for unit 620.

Figure 7:
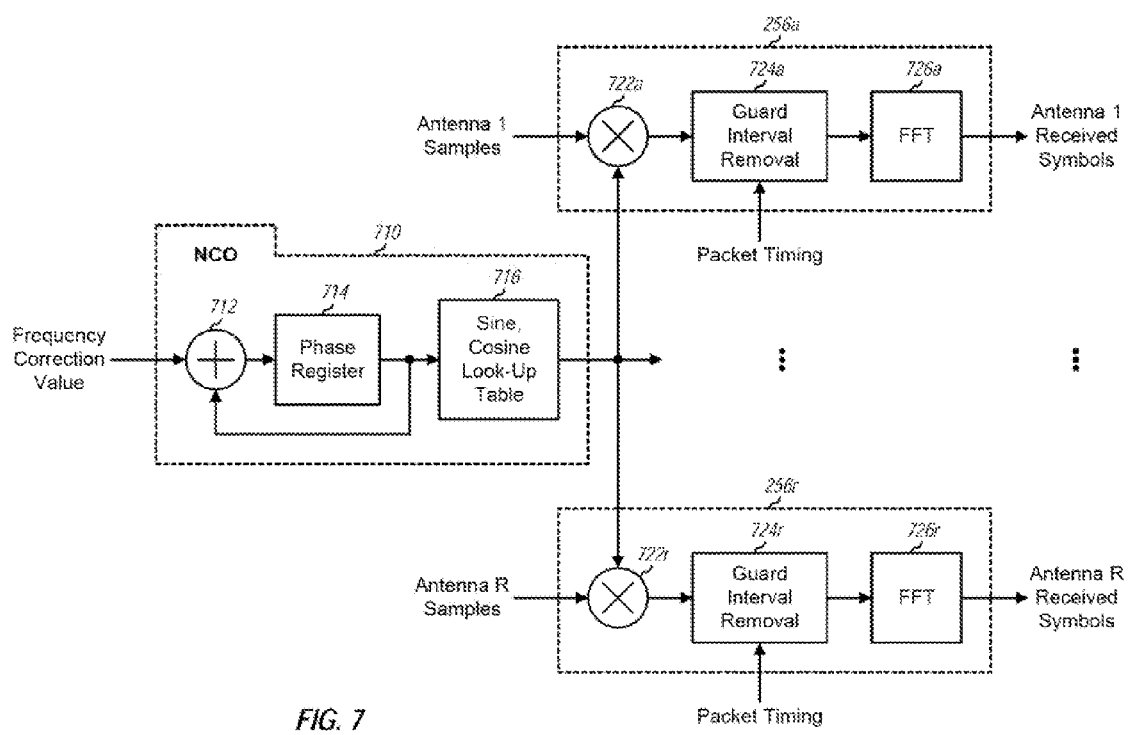
FIG. 7 shows a block diagram of demodulators and a numerically controlled oscillator (NCO) at the receiver.

FIG. 7 shows a block diagram of a design of demodulators 256a through 256r in FIG. 2 and a numerically controlled oscillator (NCO) 710. NCO 710 may be part of acquisition processor 260. Within NCO 710, a summer 712 receives a per-sample frequency correction value $\phi_s'$, e.g., from frequency error estimator 546 in FIG. 5, sums this frequency correction value with the current phase value from a register 714, and provides its output to register 714. Summer 712 and register 714 form a phase accumulator that is updated in each sample period. A look-up table 716 receives the current phase value from register 714 and provides the sine and cosine of this phase.

In one design, the frequency correction value has a resolution of 500 Hz, and the phase accumulator has a phase resolution of 1/40,000 cycle. Register 714 may be implemented with 17 bits to achieve this phase resolution. In one design, look-up table 716 may be implemented with 512×9 tables for 9-bit sine and 9-bit cosine for 512 different angles from 0 to π/4, which may provide about 50 dB SNR. Look-up table 716 may also be implemented with other sizes, e.g., 1024×9, etc.

Within each demodulator 256, a multiplier 722 receives complex-valued samples from an associated antenna, multiplies each sample with the sine and cosine for that sample, and provides a frequency-corrected sample. A unit 724 removes the guard interval for each OFDM symbol based on the packet timing from start-of-packet detector 536 in FIG. 5 and provides 64 samples for the OFDM symbol. An FFT unit 726 performs a 64-point FFT on the 64 samples from unit 724 and provides 64 received symbols for the 64 subcarriers.

Transmitter 210 may use a single reference oscillator to generate both a sample clock for digital processing and a carrier signal for upconversion. The samples at receiver 250 may then have frequency error as well as sample timing error. The frequency error may be estimated as described above and corrected by multiplier 722a through 722r. The sample timing error may be corrected by resampling the samples from receivers 254a through 254r (not shown in FIG. 7). If sample timing is not corrected (as shown in FIG. 7), then timing drift in the samples across the packet introduces a phase slope in the OFDM symbols. This phase slope changes across the packet.

Figures 8, 9:
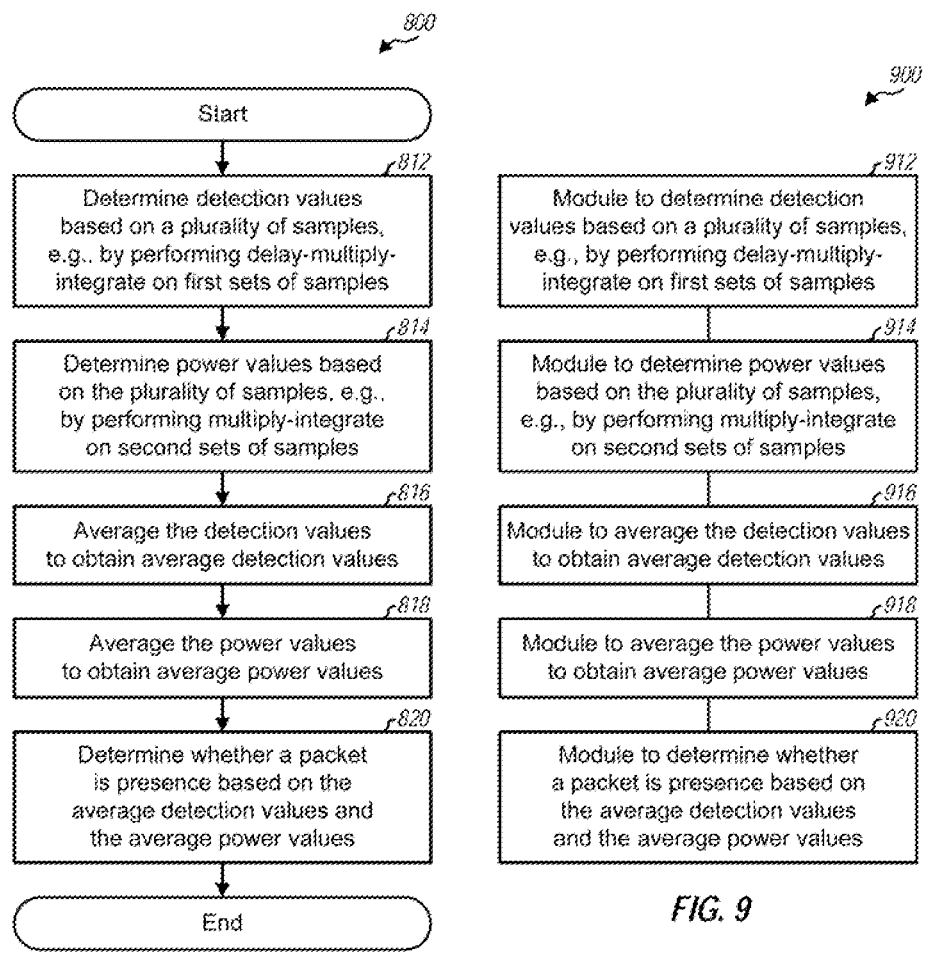
FIG. 8 shows a process to detect for the presence of a packet.
FIG. 9 shows an apparatus to detect for the presence of a packet.

FIG. 8 shows a design of a process 800 to detect for the presence of a packet. Detection values may be determined based on a plurality of samples, e.g., as shown in equation (1) (block 812). Power values may also be determined based on the plurality of samples, e.g., as shown in equation (2) (block 814). The plurality of samples may comprise samples for short training symbols and may be from one or more receive antennas. Each detection value may be obtained by performing delay-multiply-integrate on a respective first set of samples. Each power value may be obtained by performing multiply-integrate on a respective second set of samples. The detection values may be averaged to obtain average detection values, e.g., as shown in equation (3) (block 816). The power values may also be averaged to obtain average power values, e.g., as shown in equation (4) (block 818). Whether a packet is presence may then be determined based on the average detection values and the average power values (block 820).

For block 820, metric values may be determined based on the average detection values and the average power values, e.g., as shown in equation (5). In one design, the presence of a packet may be declared if a metric value exceeds a threshold value. In another design, the presence of a packet may be declared if multiple (e.g., two consecutive) metric values exceed the threshold value. In yet another design, phase shifts may be determined based on the average detection values, and whether a packet is presence may be determined further based on the phase shifts. For example, no packet is presence may be declared if a phase shift exceeds a phase threshold.

FIG. 9 shows a design of an apparatus 900 to detect for the presence of a packet. Apparatus 900 includes means for determining detection values based on a plurality of samples, e.g., by performing delay-multiply-integrate on first sets of samples (module 912), means for determining power values based on the plurality of samples, e.g., by performing multiply-integrate on second sets of samples (module 914), means for averaging the detection values to obtain average detection values (module 916), means for averaging the power values to obtain average power values (module 918), and means for determining whether a packet is presence based on the average detection values and the average power values (module 920).

FIG. 10 shows a design of a process 1000 to detect for the start of a packet. A first detection value may be determined based on a window of samples, e.g., by performing delay-multiply-integrate on the window of samples as shown in equations (1) and (3) (block 1012). A second detection value may be determined for each of multiple samples, e.g., by perform sliding delay-multiply-integrate as shown in equation (10) (block 1014). The window of samples used to derive the first detection value may be earlier than the samples used to derive each second detection value. Metric values may be computed based on the first detection value and the second detection values for the multiple samples, e.g., as shown in equation (11) (block 1016). The start of the packet may be determined based on the metric values and a threshold, e.g., as shown in equation (12) (block 1018).

FIG. 11 shows a design of an apparatus 1100 to detect for the start of a packet. Apparatus 1100 includes means for determining a first detection value based on a window of samples, e.g., by performing delay-multiply-integrate on the window of samples (module 1112), means for determining a second detection value for each of multiple samples, e.g., by perform sliding delay-multiply-integrate (module 1114), means for computing metric values based on the first detection value and the second detection values for the multiple samples (module 1116), and means for determining the start of the packet based on the metric values and a threshold (module 1118).

Figures 12, 13:
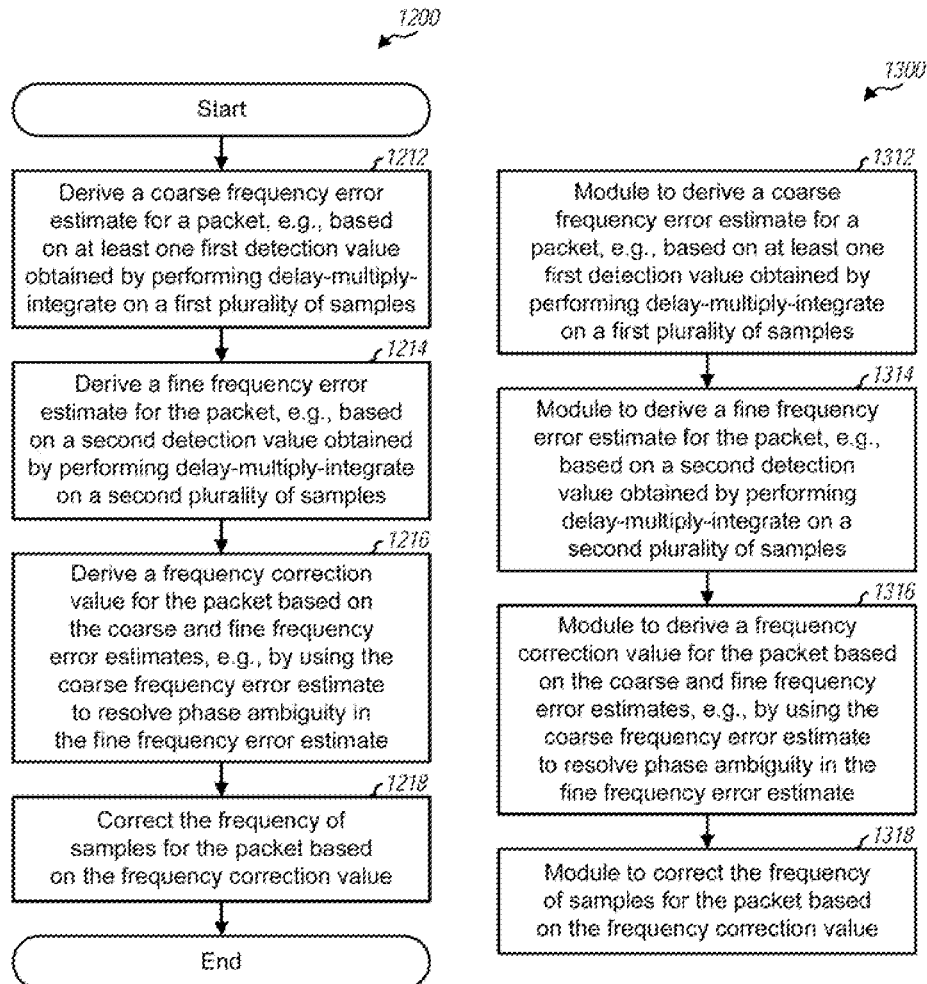
FIG. 12 shows a process for frequency correction.
FIG. 13 shows an apparatus for frequency correction.

FIG. 12 shows a design of a process 1200 for frequency correction. A coarse frequency error estimate for a packet may be derived, e.g., based on at least one first detection value obtained by performing delay-multiply-integrate on a first plurality of samples, as shown in equations (1), (3) and (8) (block 1212). A fine frequency error estimate for the packet may be derived, e.g., based on a second detection value obtained by performing delay-multiply-integrate on a second plurality of samples, as shown in equations (13) and (14) (block 1214). The delay-multiply-integrate for the at least one first detection value may be based on a first delay, e.g., 16 samples. The delay-multiply-integrate for the second detection value may be based on a second delay (e.g., 64 samples) that is longer than the first delay in order to obtain a more accurate fine frequency error estimate. The first plurality of samples may comprise samples for short training symbols. The second plurality of samples may comprise samples for short and/or long training symbols.

A frequency correction value for the packet may be derived based on the coarse and fine frequency error estimates, e.g., by using the coarse frequency error estimate to resolve phase ambiguity in the fine frequency error estimate (block 1216). For example, a first phase value may be obtained based on the coarse frequency error estimate, a second phase value may be obtained based on the fine frequency error estimate, the first phase value may be used to resolve ambiguity in the second phase value, and the ambiguity resolved second phase value may be provided as the frequency correction value. The frequency of samples for the packet may be corrected based on the frequency correction value (block 1218).

FIG. 13 shows a design of an apparatus 1300 for frequency correction. Apparatus 1300 includes means for deriving a coarse frequency error estimate for a packet, e.g., based on at least one first detection value obtained by performing delay-multiply-integrate on a first plurality of samples (module 1312), means for deriving a fine frequency error estimate for the packet, e.g., based on a second detection value obtained by performing delay-multiply-integrate on a second plurality of samples (module 1314), means for deriving a frequency correction value for the packet based on the coarse and fine frequency error estimates, e.g., by using the coarse frequency error estimate to resolve phase ambiguity in the fine frequency error estimate (module 1316), and means for correcting frequency of samples for the packet based on the frequency correction value (block 1318).

FIG. 14 shows a design of a process 1400 to detect for the end of a packet. A detection value may be determined for each of multiple symbol periods, e.g., by correlating a guard interval with a corresponding useful portion in the symbol period, as shown in equation (16) (block 1412). In general, any copied portion of a transmission symbol may be correlated with the original portion to obtain the detection value for that symbol. A threshold value may be determined for each symbol period, e.g., based on a moving average of S detection values for S symbol periods up to the current symbol period, as shown in equation (17) (block 1414). The end of the packet may be determined based on the detection values and threshold values for the multiple symbol periods (block 1416). In one design, the detection value may be compared against the threshold value in each symbol period, the threshold value may be frozen after a symbol period in which the detection value is less than the threshold value, and the end of the packet may be declared if the detection value for next symbol period is less than the threshold value.

FIG. 15 shows a design of an apparatus 1500 to detect for the end of a packet. Apparatus 1500 includes means for determining a detection value for each of multiple symbol periods, e.g., by correlating a guard interval with a corresponding useful portion (module 1512), means for determining a threshold value for each symbol period, e.g., based on a moving average of S detection values for S symbol periods up to the current symbol period (module 1514), and means for determining the end of the packet based on the detection values and threshold values for the multiple symbol periods (module 1516).

FIG. 16 shows a design of a process 1600 for processing a packet. First detection values $C_k$ may be determined based on a first plurality of samples (block 1612). Power values $P_k$ may be determined based on the first plurality of samples (block 1614). Whether a packet is presence may be determined based on the detection values and the power values (block 1616). Second detection values $C_i$ may be determined based on a second plurality of samples (block 1618). The start of the packet may be determined based on the first and second detection values (block 1620). A third detection value $D_m$ may be determined based on a third plurality of samples (block 1622). Frequency error of the packet may be estimated based on the first and third detection values (block 1624). Fourth detection values $G_n$ may be determined based on a fourth plurality of samples (block 1626). The end of the packet may be determined based on the fourth detection values (block 1628).

FIG. 17 shows a design of an apparatus 1700 for processing a packet. Apparatus 1700 includes means for determining first detection values $C_k$ based on a first plurality of samples (module 1712), means for determining power values $P_k$ based on the first plurality of samples (module 1714), means for determining whether a packet is presence based on the detection values and the power values (module 1716), means for determining second detection values $C_i$ based on a second plurality of samples (module 1718), means for determining the start of the packet based on the first and second detection values (module 1720), means for determining a third detection value $D_m$ based on a third plurality of samples (module 1722), means for estimating frequency error of the packet based on the first and third detection values (module 1724), means for determining fourth detection values $G_n$ based on a fourth plurality of samples (module 1726), and means for determining the end of the packet based on the fourth detection values (module 1728).

The modules in FIGS. 9, 11, 13, 15 and 17 may comprise processors, electronics devices, hardware devices, electronics components, logical circuits, memories, etc., or any combination thereof.

The delay-multiply-integrate technique described above may provide good detection performance and is not affected by multipath in a wireless environment. In another design, packet detection is performed based on correlation with known samples. In this design, the received samples may be correlated with the known samples for the short training symbols at different time offsets. Detection values exceeding a first threshold, which may correspond to different multipaths, may be combined to obtain a final detection value. The final detection value may then be compared against a second threshold to detect the presence of a packet. The time offsets that yield strong detection values may be used to determine the start of the packet.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof For a firmware and/or software implementation, the techniques may be implemented with modules (e.g., procedures, functions, etc.) that perform the functions described herein. The firmware and/or software instructions may be stored in a memory (e.g., memory 272 in FIG. 2) and executed by a processor (e.g., processor 260 or 270). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured to determine a first detection value based on a window of samples, to determine a second detection value for each of multiple samples, and to determine start of a packet based on the first detection value and the second detection values for the multiple samples, wherein the processor is configured to perform delay-multiply-integrate on the window of samples to obtain the first detection value; and
a memory coupled to the processor.

2. The apparatus of claim 1, wherein the processor is further to perform sliding delay-multiply-integrate to obtain the second detection value for each of the multiple samples.

3. The apparatus of claim 2, wherein the window of samples used to derive the first detection value is earlier than samples used to derive each second detection value.

4. The apparatus of claim 1, wherein the processor is further configured to compute metric values based on the first detection value and the second detection values, and to determine the start of the packet based on the metric values and a threshold.

5. A method comprising:
determining a first detection value based on a window of samples, wherein the first detection value is determined by a delay-multiply-integrate on the window of samples;
determining a second detection value for each of multiple samples; and
determining start of a packet based on the first detection value and the second detection values for the multiple samples.

6. The method of claim 5, wherein the determining the start of the packet comprises:
- computing metric values based on the first detection value and the second detection values, and
- determining the start of the packet based on the metric values and a threshold.

7. An apparatus comprising:
- a processor configured to determine a detection value for each of multiple symbol periods, wherein the processor is further configured to determine a threshold value for each symbol period based on an average of S detection values for S symbol periods up to current symbol period, where S is one or greater, and to detect end of a packet based on detection values and threshold values for the multiple symbol periods; and
- a memory coupled to the processor.

8. The apparatus of claim 7, wherein the processor is further configured to compare the detection value against the threshold value in each symbol period, to freeze the threshold value after a symbol period in which the detection value is less than the threshold value, and to declare the end of the packet if the detection value for next symbol period is less than the threshold value.

9. A method comprising:
- determining a detection value for each of multiple symbol periods;
- determining a threshold value for each symbol period based on an average of S detection values for S symbol periods up to current symbol period, where S is one or greater; and
- detecting the end of the packet based on the detection values and threshold values for the multiple symbol periods.

10. The method of claim 9, wherein the detecting the end of the packet comprises:
- comparing the detection value against the threshold value in each symbol period;
- freezing the threshold value after a symbol period in which the detection value is less than the threshold value; and
- declaring the end of the packet if the detection value for next symbol period is less than the threshold value.

11. An apparatus comprising:
- a processor configured to determine first detection values based on a first plurality of samples, to determine power values based on the first plurality of samples, to determine whether a packet is present based on the first detection values and the power values, to determine second detection values based on a second plurality of samples, and to determine start of the packet based on the first and second detection values; and
- a memory coupled to the processor.

12. The apparatus of claim 11, wherein the processor is further configured to determine a third detection value based on a third plurality of samples, and to estimate frequency error of the packet based on the first and third detection values.

13. The apparatus of claim 12, wherein the processor is further configured to determine fourth detection values based on a fourth plurality of samples, and to determine end of the packet based on the fourth detection values.

14. A method comprising:
- determining first detection values based on a first plurality of samples;
- determining power values based on the first plurality of samples;
- determining whether a packet is present based on the first detection values and the power values;
- determining second detection values based on a second plurality of samples; and
- determining start of the packet based on the first and second detection values.

15. The method of claim 14, further comprising:
- determining a third detection value based on a third plurality of samples; and
- estimating frequency error of the packet based on the first and third detection values.

16. The method of claim 15, further comprising:
- determining fourth detection values based on a fourth plurality of samples, and
- determining end of the packet based on the fourth detection values.

* * * * *